United States Patent
Wei

(10) Patent No.: US 11,247,449 B2
(45) Date of Patent: Feb. 15, 2022

(54) METHODS OF THINNING SUBSTRATE AND THINNING DISPLAY PANEL

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 872 days.

(21) Appl. No.: 15/778,025

(22) PCT Filed: Oct. 25, 2017

(86) PCT No.: PCT/CN2017/107661
§ 371 (c)(1),
(2) Date: May 22, 2018

(87) PCT Pub. No.: WO2018/188314
PCT Pub. Date: Oct. 18, 2018

(65) Prior Publication Data
US 2021/0170736 A1    Jun. 10, 2021

(30) Foreign Application Priority Data

Apr. 14, 2017   (CN) .......................... 201710244204.3

(51) Int. Cl.
*C08F 290/04*    (2006.01)
*B32B 38/10*    (2006.01)
*B32B 37/12*    (2006.01)

(52) U.S. Cl.
CPC .......... *B32B 38/10* (2013.01); *B32B 37/1284* (2013.01); *B32B 2457/20* (2013.01)

(58) Field of Classification Search
CPC . B32B 38/10; B32B 37/1284; B32B 2457/20; G09F 9/00
See application file for complete search history.

(56) References Cited

U.S. PATENT DOCUMENTS 6,197,209 B1 *   3/2001   Shin ...................... G02F 1/1333
                                                           216/84
2009/0213319 A1   8/2009   Sasaki et al.
(Continued)

FOREIGN PATENT DOCUMENTS

| CN | 1716056 A | 1/2006 |
|---|---|---|
| CN | 103969867 A | 8/2014 |

(Continued)

OTHER PUBLICATIONS

Chinese Office Action in Chinese Application No. 201710244204.3, dated Oct. 8, 2018 with English translation.
(Continued)

*Primary Examiner* — Vishal I Patel
(74) *Attorney, Agent, or Firm* — Collard & Roe, P.C.

(57) ABSTRACT

A method of thinning a substrate and a method of thinning a display panel are disclosed. In the method of thinning the display panel, the display panel includes an upper substrate and a lower substrate disposed opposite to each other; the method includes: forming an adhesive layer between two surfaces of the upper substrate and the lower substrate which are face to face, the adhesive layer fills a gap between the upper substrate and the lower substrate, extends and overlays a part of a side surfaces of the display panel; and removing part of the display panel which corresponds to remaining part of the side surface non-overlaid by the adhesive layer.

12 Claims, 5 Drawing Sheets

(56) References Cited

U.S. PATENT DOCUMENTS

2014/0204293 A1    7/2014   Kim et al.
2015/0177557 A1    6/2015   Chang et al.
2016/0377911 A1   12/2016   Wu

FOREIGN PATENT DOCUMENTS

| | | |
|---|---|---|
| CN | 103995399 A | 8/2014 |
| CN | 104460119 A | 3/2015 |
| CN | 104536202 A | 4/2015 |
| CN | 104497944 B | 6/2016 |
| CN | 106430991 A | 2/2017 |
| CN | 106816096 A | 6/2017 |
| JP | 2006-243658 A | 9/2006 |

OTHER PUBLICATIONS

International Search Report of PCT/CN2017/107661 in Chinese, dated Jan. 29, 2018 with English translation.
Notice of Transmittal of the International Search Report of PCT/CN2017/107661 in Chinese, dated Jan. 29, 2018.
Written Opinion of the International Searching Authority of PCT/CN2017/107661 in Chinese, dated Jan. 29, 2018 with English translation.

* cited by examiner

METHODS OF THINNING SUBSTRATE AND THINNING DISPLAY PANEL

CROSS REFERENCE TO RELATED APPLICATIONS

This application is the National Stage of PCT/CN2017/107661 filed on Oct. 25, 2017, which claims priority under 35 U.S.C. § 119 of Chinese Application No. 201710244204.3 filed on Apr. 14, 2017, the disclosure of which is incorporated by reference.

TECHNICAL FIELD

Embodiments of the present disclosure relate to a field of display panel, especially relate to a method of thinning a substrate and a method of thinning a display panel.

BACKGROUND

Currently, as the requirements of users for display products have gradually increased, lightness and thinness of the display panel has been paid more and more attention, especially in three-dimensional and double-view areas, the display panel needs to be thinned to meet its optical requirements. The current thinning process of the display panel is commonly performed on the whole display motherboard, however, because the thinned display panel needs a certain strength and other property during follow-up processes such as cutting process, the thinning process of the display panel is limited to certain extent and cannot meet the requirements of users.

SUMMARY

At least one of embodiments of the present disclosure provides a method of thinning a substrate and a method of thinning a display panel.

At least one of embodiments of the present disclosure provides a method of thinning a display panel, wherein the display panel comprises an upper substrate and a lower substrate disposed opposite to each other, the method of thinning the display panel comprises: forming an adhesive layer between two surfaces of the upper substrate and the lower substrate which are face to face, wherein the adhesive layer is configured to fill a gap between the upper substrate and the lower substrate, extend to and overlay a part of a side surface of the display panel; and removing part of the display panel which corresponds to remaining part of the side surface non-overlaid by the adhesive layer.

At least one of embodiments of the present disclosure provides a method of thinning a substrate, wherein the substrate comprises a base substrate and an electronic device disposed on the base substrate, the method comprises: forming an adhesive layer, wherein the adhesive layer is configured to overlay at least the electronic device, extend to and overlay part of a side surface of the base substrate; and removing part of the base substrate which corresponds to remaining part of the side surface non-overlaid by the adhesive layer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
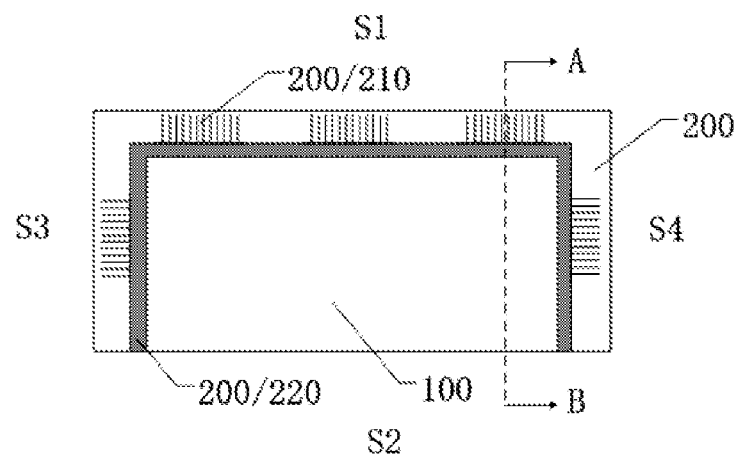
FIG. 1 schematically illustrates a top view of a display panel to be thinned according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In existing method of cutting a display panel, a large display motherboard is first thinned, and then cut into multiple single display sub-boards. After the display motherboard is thinned, the strength of the thinned surface is reduced. Therefore, in order to guarantee the defect-free ratio of the product during the cutting process, the thinned portion of the motherboard cannot be larger.

At least one embodiment of the present disclosure provides a method of thinning a substrate and a method of thinning a display panel. Taking the display panel as an example, the thinning process of the display panel is performed on the display sub-board obtained from cutting the display motherboard. Because the display sub-board does not undergo the cutting process, the strength requirement of the thinned surface is relatively low, the thickness of the display panel can be further reduced by the thinning process.

However, after the display motherboard is cut into the display sub-board, important parts of the display sub-board such as a circuit region may be exposed, and which may be corroded in the thinning process.

At least one embodiment of the present disclosure provides a method of thinning a substrate and a method of thinning a display panel, by which electronic circuits of the display panel or the substrate can be protected in thinning process, therefore, the thinning defect-free ratio can be increased.

At least one embodiment of the present disclosure provides a method of thinning a display panel, and the display panel comprises an upper substrate and a lower substrate disposed opposite to each other. The method of thinning the display panel comprises: forming an adhesive layer between two surfaces of the upper substrate and the lower substrate which are face to face, the adhesive layer is configured to fill a gap between the upper substrate and the lower substrate, extend to and overlay part of a side surface of the display panel; and removing part of the display panel which corresponds to remaining part of the side surface non-overlaid by the adhesive layer.

In the present thinning method, the adhesive layer is disposed on part of a side surface of the display panel and in the gap between the upper and lower substrates, by which the display panel overlaid with the adhesive layer can be protected, and a portion of the display panel to be thinned can be defined by the adhesive layer, therefore, the thinning defect-free ratio of the display panel can be increased.

Figure 2:
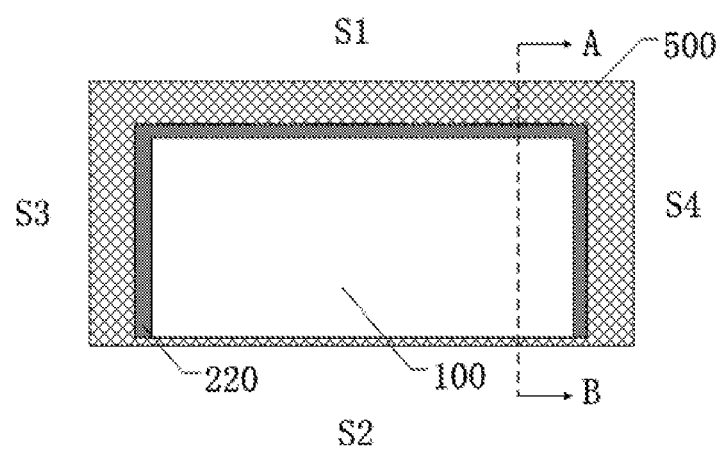
FIG. 2 schematically illustrates a top view of a display panel before being thinned according to an embodiment of the present disclosure.

For example, in at least one embodiment of the present disclosure, the display panel comprises a display region and a non-display region, and the adhesive layer overlays at least the non-display region. For example, FIG. 1 illustrates a top view of a display panel to be thinned according to an embodiment of the present disclosure. As illustrated in FIG. 1, the lower substrate may comprise the display region 100 and the non-display region 200 disposed on a periphery of the display region 100. For example, the non-display region 200 may comprises a circuit region 210, the circuit region 210 may be a circuit in the non-display region 200, the circuit region 210 may be disposed on two sides of the display panel, and may also be disposed on three sides of the display panel. The position of the circuit region 210 depends on the actual design requirement of the display panel, and it is not limited to the embodiments of the present disclosure. Hereinafter, the embodiments provided in the present disclosure will be described by taking an example that the circuit region 210 is disposed on three sides of the display panel illustrated in FIG. 1. For example, the non-display region 200 may further comprises an area overlaid with a sealant 220, the two substrates of the display panel may be sealed by the sealant 220 so as to form a cell, and the foreign objects are prevented from intruding into the box by the sealant 220. For example, FIG. 2 illustrates a top view of a display panel after forming an adhesive layer according to an embodiment of the present disclosure. As illustrated in FIG. 2, the adhesive layer 500 may overlay at least the circuit region 210 of the non-display region 200, in order to avoid the corrosion of the circuit region 210 caused by the corrosive solution in the thinning process. The adhesive layer 500 extends to and overlays a part of a side surface of the display panel, so the part of side surface overlaid with the adhesive layer 500 may be protected from being damaged during the thinning process of the display panel. For example, the adhesive layer 500 continuously overlays each side surfaces of the display panel on the periphery of the display panel. As illustrated in FIG. 2, the display panel comprises four side surfaces, S1 represents a first side surface, S2 represents a second side surface, S3 represents a third side surface, and S4 represents a fourth side surface. Each of four side surfaces S1, S2, S3 and S4 is perpendicular to a main surface of the display panel. For example, each of four side surfaces of S1, S2, S3 and S4 is continuously overlaid by the adhesive layer 500. Taking the first side surface S1 as an example, the adhesive layer 500 overlays a part of the first side surface S1 of the display panel, thus the part of the first side surface S1 overlaid with the adhesive layer 500 could be protected during the thinning process.

For example, in at least one embodiment of the present disclosure, the method of thinning the display panel further comprises: forming a release film between the adhesive layer and the non-display region; the release film is in contact with and overlays the non-display region, and an outer edge of the release film is coplanar with an outer edge of the lower substrate.

Figure 3A:
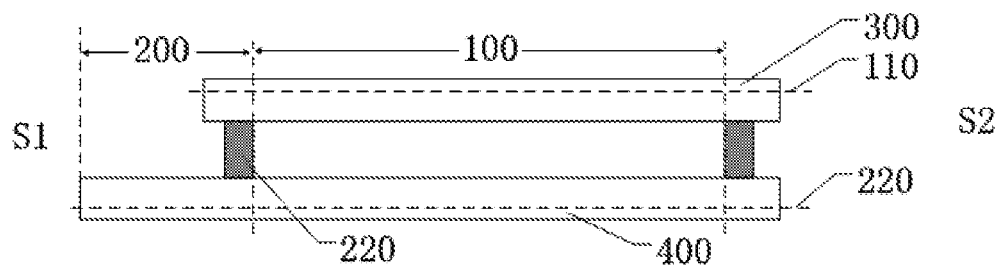
FIGS. 3a to 3f schematically illustrate steps of a method of thinning display panel according to an embodiment of the present disclosure.
Figure 3B:
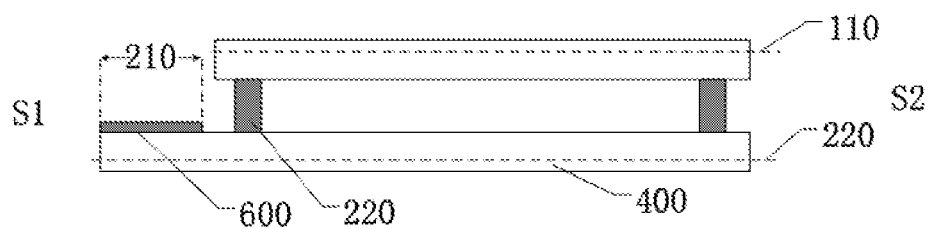
Figure 4A:
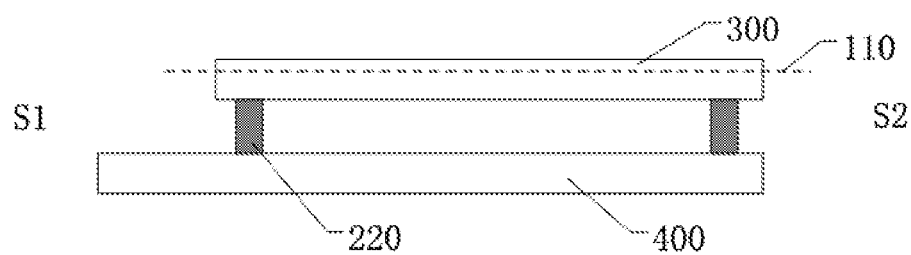
FIGS. 4a to 4g schematically illustrate steps of another method of thinning display panel according to an embodiment of the present disclosure.
Figure 4B:
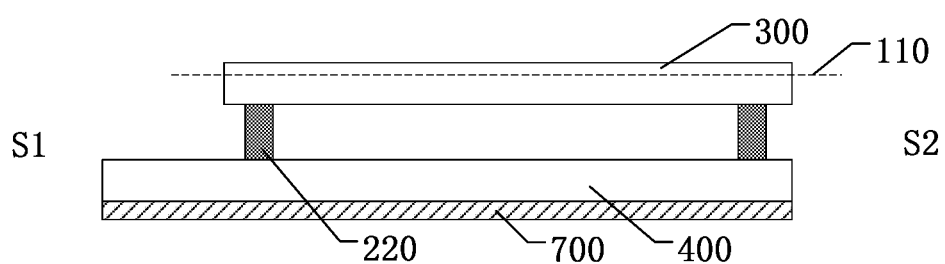
Figure 4C:
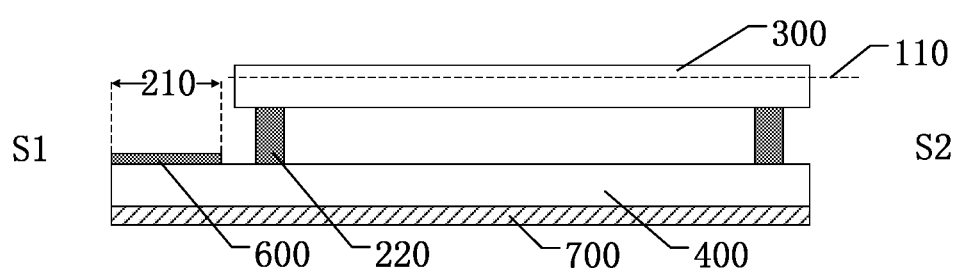

For example, after the display panel is thinned, the adhesive layer is removed. While the adhesive layer 500 is removed from the circuit region 210, the circuit region 210 may be damaged due to the strong adhesion of the adhesive layer 500. Therefore, the release film 600 may be formed between the adhesive layer 500 and the non-display region 200, as illustrated in FIG. 3b or FIG. 4c. The release film 600 may be a corrosion-resistant film, during the thinning process of the display panel, the circuit region 210 can be protected by the release film 600; the release film 600 may be made of material such as a corrosion-resistant adhesive tape, therefore, it is easily separated from the display panel without any remnant on the non-display region 200 or any damage to the circuit region 210.

For example, in at least one embodiment of the present disclosure, after removing part of the display panel which corresponds to remaining part of the side surface non-overlaid by the adhesive layer, the method of thinning the display panel further comprises: peeling the release film and the adhesive layer together from the display panel.

Figure 3C:
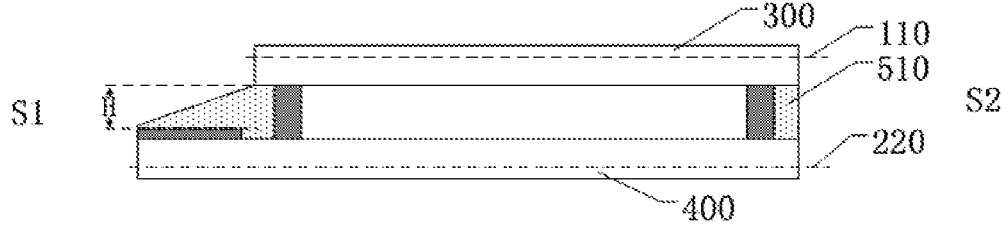
Figure 3D:
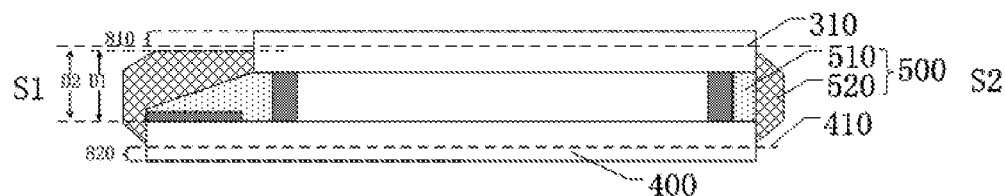
Figure 3E:
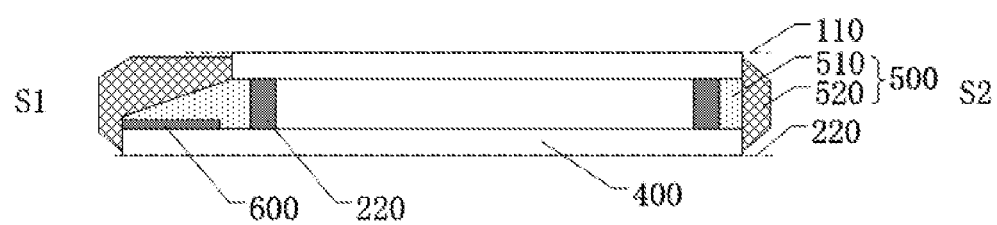

For example, the release film 600 and the adhesive layer 500 as illustrated in FIG. 3e are peeled together from the display panel. Since the release film 600 is easy to be peeled off, the adhesive layer 500 cannot be remained on the regions such as the circuit region 210 overlaid with the release film 600, and the structures such as the circuit region 210 cannot be damaged during the process of peeling the adhesive layer 500. It can be understood that, in other embodiments, the adhesive layer 500 may be directly removed by physical or chemical method without forming the release film 600, which can also achieve the purpose of the present disclosure.

For example, in at least one embodiment of the present disclosure, the adhesive layer has two-layer structure. For example, as illustrated in FIG. 3d, the adhesive layer 500 may comprise a first adhesive layer 510. The first adhesive layer 510 is made of a material such as a material with low viscosity and high fluidity, therefore, it is easy to fill the gap between the upper substrate 300 and the lower substrate 400. For example, the adhesive layer 500 may further comprise a second adhesive layer 520. The second adhesive layer 520 may overlay the first adhesive layer 510 and part of side surface of the upper substrate 300 and part of side surface of the lower substrate 400, and the remaining part of side surface of the upper substrate 300 and the remaining part of side surface of the lower substrate 400 are exposed. The second adhesive layer 520 is made of a material such as a material with high viscosity, low fluidity and easy molding. It is noted that, in embodiments of the present disclosure, the adhesive layer 500 is not limited to a two-layer structure as illustrated in FIG. 3d; if the adhesive layer 500 is made of a material with high fluidity and easy molding, the adhesive layer 500 may also be a single-layer structure, and it is not limited in the present disclosure hereto.

For example, in at least one embodiment of the present disclosure, the upper substrate and the lower substrate may be an array substrate and a color filter substrate respectively. For example, the upper substrate is one of the array substrate and the color filter substrate, and the lower substrate is the other one of the array substrate and the color filter substrate.

The thinning method provided in the embodiments is suitable for double-sided thinning of a display panel, and is also suitable for single-sided thinning of a display panel. According to two specific embodiments, the two thinning methods would be described in detail below.

FIGS. 3a to 3f illustrate steps of a method of double-sided thinning display panel according to an embodiment of the present disclosure. FIG. 3a illustrates a cross-sectional view of the display panel along A-B line of FIG. 1.

As illustrated in FIGS. 3a to 3f, there is provided a method of thinning display panel according to at least one embodiment of the present disclosure, which comprises:

Providing a display panel to be thinned. For example, as illustrated in FIG. 3a, the display panel may comprise an upper substrate 300 and a lower substrate 400 which are disposed opposite to each other, the display panel comprises a display region 100 and a non-display region 200 disposed on a periphery of the display region 100. A presupposed first thinned surface 310 is located in the upper substrate 300, and a presupposed second thinned surface 320 is located in the lower substrate 400; the first thinned surface 310 and the second thinned surface 320 are fictitious surfaces, each of which represents a thinned thickness of the display panel. The positions of the first thinned surface 310 and the second thinned surface 320 are defined by other structures such as an adhesive layer 500.

Forming a release film in the non-display region of the display panel. For example, as illustrated in FIG. 3b, the release film 600 is formed in the non-display region 200 of the display panel; the release film 600 is in contact with and overlays at least part of the non-display region 200. For example, the release film 600 overlays at least a circuit region 210 in the non-display region 200. The release film 600 may also overlay the non-display region 200 of the display panel as much as possible, in order to expand a protection range for the non-display region 200. For example, an outer edge of the release film 600 may be coplanar with an outer edge of the lower substrate 400.

Forming a first adhesive layer. For example, as illustrated in FIG. 3c, the first adhesive layer 510 is formed. For example, the first adhesive layer 510 fills a gap between the upper substrate 300 and the lower substrate 400, that is, it may be formed on two facing surfaces of the upper substrate 300 and the lower substrate 400. A step of forming the first adhesive layer 510, for example, may comprise: coating a first adhesive material, and curing it. For example, the first adhesive layer 510 may also overlay the release film 600, when the bonding strength between the release film 600 and the non-display region 200 is not strong enough, the circuit region 210 overlaid with the release film 600 can be protected by the first adhesive layer 510.

While forming the release film 600, there may be a certain gap between the release film 600 and the upper substrate 300, so that the first adhesive layer 510 may enter in the gap between the upper substrate 300 and the lower substrate 400. For example, as illustrated in FIG. 3c, a distance H between the release film 600 and the upper substrate 300 may be ranged from 1 millimeter to 2 millimeter.

For example, the first adhesive material may be a skin drying glue or an ultraviolet curable glue (UV glue) etc., and a viscosity of the first adhesive layer 510 may be ranged from 100 centipoises to 1000 centipoises. A method of curing the first adhesive material comprises spontaneous curing or ultraviolet curing etc.

Forming a second adhesive layer on the first adhesive layer. For example, as illustrated in FIG. 3d, the second adhesive layer 520 is formed on the first adhesive layer 510. The second adhesive layer 520 may overlay part of a side surface of the upper substrate 300 and overlay part of a side surface of the lower substrate 400, the two side surfaces are located on a same side of the display panel, the remaining part of the side surface of the upper substrate 300 and the remaining part of the side surface of the lower substrate 400 are exposed. A step of forming the second adhesive layer 520, for example, may comprise: coating a second adhesive material, and curing it.

For example, the second adhesive material may be a skin drying glue or an ultraviolet curable glue (UV glue) etc., and a viscosity of the second adhesive layer 520 may be ranged from 500 centipoises to 10000 centipoises. A curing method of the second adhesive material comprises spontaneous curing or ultraviolet curing etc.

As illustrated in FIG. 3d, a first thinned surface 310 parallel to the upper substrate 300 may be located in the upper substrate 300; a second thinned surface 410 parallel to the lower substrate 400 may be located in the lower substrate 400. The first thinned surface 310 and the second thinned surface 410 are fictitious surfaces. The positions of the first thinned surface 310 and the second thinned surface 320 are defined by the adhesive layer 500. For example, a location of the first thinned surface 310 may be defined by an edge of the adhesive layer 500 which is in contact with the upper substrate 300, and a location of the second thinned surface 410 may be defined by an edge of the adhesive layer 500 which is in contact with the lower substrate 400. The fluidity of the adhesive layer 500 is set in a way that the adhesive layer 500 is capable of filling the gap between the upper substrate 300 and the lower substrate 400; The plasticity of the adhesive layer 500 is set in a way that the adhesive layer 500 is capable of defining the locations of the thinned surfaces such as the first tinned surface 310 and the second thinned surface 410. Thus, the protective effect of the adhesive layer 500 on the display panel can be ensured.

As illustrated in FIG. 3d, the second adhesive layer 520 serves to define locations of the first thinned surface 310 and the second thinned surface 410. A plane, where an edge of the second adhesive layer 520 away from the lower substrate 400 is located, coincides with the first thinned surface 310; a plane, where an edge of the second adhesive layer 520 away from the upper substrate 300 is located, coincides with the second thinned surface 410.

It is noted that, in order to avoid an uneven surface of the display panel after the thinning process, the second adhesive layer 520 may be formed between the presupposed first thinned surface 310 and the presupposed second thinned surface 410. For example, a distance from the edge of the second adhesive layer 520 away from the lower substrate 400 to the lower substrate 400 is less than a distance from the first thinned surface 310 to the lower substrate 400. For example, a distance from an edge of the second adhesive layer 520 away from the upper substrate 300 to the upper substrate 300 is less than a distance from the second thinned surface 410 to the upper substrate 300. For example, as illustrated in FIG. 3d, the distance D1 from the edge of the second adhesive layer 520 away from the lower substrate 400 to the lower substrate 400 is less than the distance D2 from the first thinned surface 310 to the lower substrate 400.

Removing a first portion of the upper substrate and a second portion of the lower substrate, the first portion of the upper substrate being away from the lower substrate and bounded by the first thinned surface, and the second portion of the lower substrate being away from the upper substrate and bounded by the second thinned surface. For example, as illustrated in FIG. 3e, the first portion 810 of the upper substrate 300 away from the lower substrate 400 and bounded by the first thinned surface 310 is removed, at the same time, a second portion 820 of the lower substrate 400 away from the upper substrate 300 and bounded by the second thinned surface 410 is removed.

For example, any method for removing the first portion 810 and the second portion 820 may be adopted in embodiments of the present disclosure. Exemplarily, the removing methods may comprise a physical method or a chemical method etc. The chemical thinning method, for example, comprises liquid soaking, and the liquid comprises, but is not limited to, at least one of sulfuric acid, nitric acid, hydrochloric acid or hydrofluoric acid; the physical thinning method comprises grinding, polishing and the like.

Figure 3F:
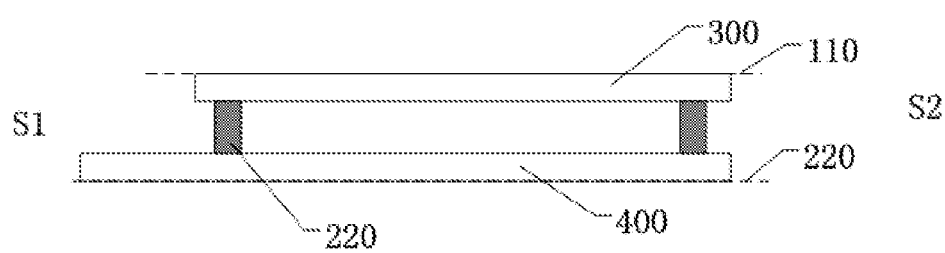

Removing structures such as the adhesive layer from the display panel. For example, as illustrated in FIG. 3f, the first adhesive layer 510, the second adhesive layer 520, and the release film 600 and the like are removed.

In the method of the present embodiment, the step of disposing the release film 600 in the non-display region 200 of the display panel may be omitted, therefore, the step of removing the release film 600 may be omitted during the process of removing the structures such as the adhesive layer from the display panel. The release film 600 serves to reduce the influence on the non-display region while removing the adhesive layer 500.

Compared with the method of double-sided thinning display panel, the method of single-sided thinning display panel is only performed on one side of the display panel, and the other side of the display panel is covered during the thinning process. The method of thinning the upper substrate 300 of the display panel is described below as an example.

FIGS. 4a to 4g illustrate steps of a method of single-sided thinning display panel according to an embodiment of the present disclosure.

As illustrated in FIGS. 4a to 4g, there is provided a method of thinning display panel according to at least one embodiment of the present disclosure, which comprises:

Providing a display panel to be thinned. For example, as illustrated in FIG. 4a, the display panel may comprise an upper substrate 300 and a lower substrate 400 which are disposed opposite to each other, the display panel comprises a display region 100 and a non-display region 200 disposed on a periphery of the display region 100. A presupposed first thinned surface 310 is located in the upper substrate 300, and the first thinned surface 310 is a fictitious surface, which represents a thinned thickness of the display panel. The position of the first thinned surface 310 is defined by other structures such as an adhesive layer 500.

Forming a protective layer on at least one outermost surface of the lower substrate. For example, as illustrated in FIG. 4b, the protective layer 700 is formed on at least one outermost surface of the lower substrate 400. The outermost surface of the lower substrate 400 may be protected by the protective layer 700, in order to prevent the lower substrate 400 from being corroded in the thinning process. The protective layer 700 may be made of a dense corrosion-resistant material, such as paraffin and anti-corrosion adhesive tape etc. The protective layer 700 may be in contact with the adhesive layer 500, for example, the protective layer 700 may be in contact with the second adhesive layer 520, and therefore, by using the protective layer 700 and the adhesive layer 500, the lower substrate 400 may be protected from being corroded in the thinning process of the display panel.

Forming a release film. For example, as illustrated in FIG. 4c, the release film 600 is disposed in the non-display region 200 of the display panel, and the release film 600 is in contact with and overlays at least part of the non-display region 200, for example, the release film 600 overlays at least a circuit region 210 of the non-display region 200. The manner of disposing the release film 600 may be referred to the aforementioned embodiment, which will not be described herein.

Figure 4D:
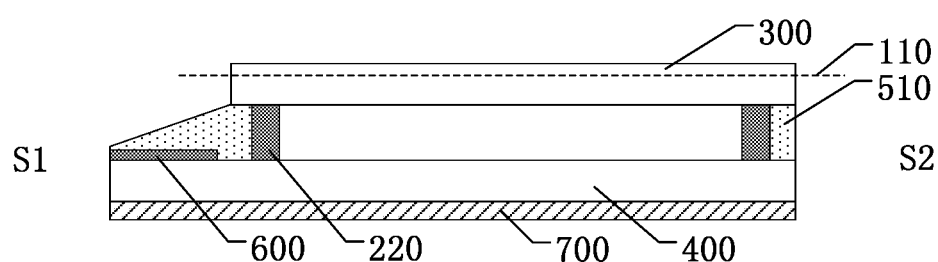

Forming a first adhesive layer. For example, as illustrated in FIG. 4d, the first adhesive layer 510 may fill the gap between the upper substrate 300 and the lower substrate 400, that is, it may be formed on two facing surfaces of the upper substrate 300 and the lower substrate 400. A step of forming the first release film 510, for example, comprises: coating a first adhesive material, and curing it. The material and the arrangement of the first adhesive layer 510 may be referred to the aforementioned embodiment, which will not be described herein.

Figure 4E:
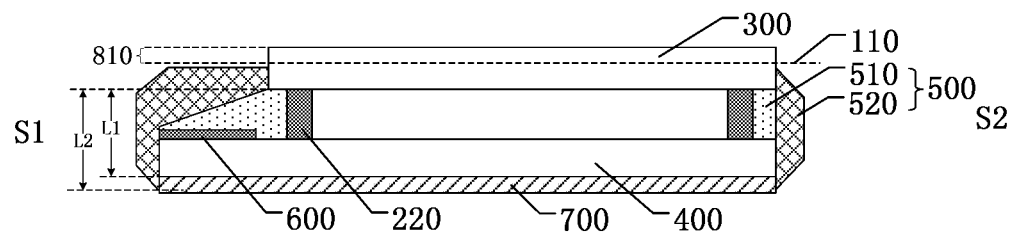

Forming a second adhesive layer. For example, as illustrated in FIG. 4e, the second adhesive layer 520 is formed on the first adhesive layer 510. The second adhesive layer 520 may overlay part of a side surface of the upper substrate 300 and part of a side surface of the lower substrate 400, the remaining parts of side surfaces of the upper substrate 300 and the lower substrate 400 are exposed. A step of forming the second adhesive layer 520, for example, comprises: coating a second adhesive material, and curing it. In the present embodiment, the second adhesive layer 520 is in contact with the protective layer 700. A distance from an edge of the second adhesive layer 520 away from the upper substrate 300 to the upper substrate 300 is greater than or equal to the distance from an edge of the protective layer 700 close to the upper substrate 300 to the upper substrate 300. The distance from the edge of the second adhesive layer away from the lower substrate to the lower substrate is less than or equal to the distance from the first thinned surface to the lower substrate. For example, as illustrated in FIG. 4e, the distance L2 from the edge of the second adhesive layer 520 away from the upper substrate 300 to the upper substrate 300 is greater than or equal to the distance L1 from the edge of the protective layer 700 close to the upper substrate 300 to the upper substrate 300. The material and the arrangement of the second adhesive layer 520 may be referred to the aforementioned embodiment, which will not be described herein.

A first thinned surface 110 parallel to the upper substrate 300 is located in the upper substrate 300, and the arrangement of the first thinned surface 110 may be referred to the aforementioned embodiment, which will not be described herein.

Figure 4F:
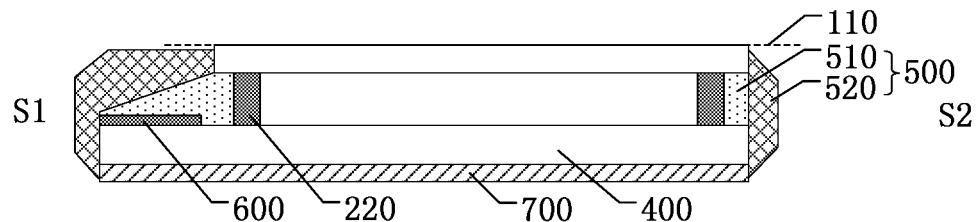

Removing a first portion of the upper substrate away from the lower substrate and bounded by the first thinned surface. For example, as illustrated in FIG. 4f, the first portion 810 of the upper substrate 300 away from the lower substrate 400 and bounded by the first thinned surface 310 is removed. The removing method may be referred to the aforementioned embodiment, which will not be described herein.

Figure 4G:
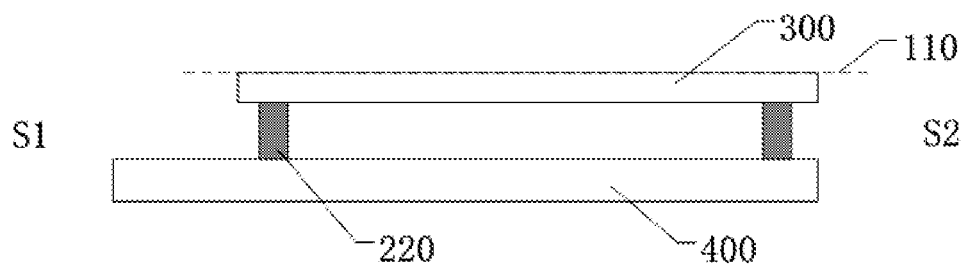

Removing structures such as the adhesive layer on the display panel. For example, as illustrated in FIG. 4g, the first adhesive layer 510, the second adhesive layer 520, the release film 600 and the protective layer 700 are removed.

In the present method, the requirement of forming the release film depends on actual requirements. Additionally, an order of forming the protective layer 700, the first adhesive layer 510 and the second adhesive layer 520 may be changed. For example, after the protective layer 700 is formed on the lower substrate 400, the first adhesive layer 510 and the second adhesive layer 520 may be sequentially formed on the lower substrate 400; or the first adhesive layer 510 is first formed, and then the protective layer 700 is formed, next, the second adhesive layer 520 is formed; or after the first adhesive layer 510 and the second adhesive layer 520 are sequentially formed, the protective layer 700 is formed on the lower substrate 400. As long as the protective layer 700 and the adhesive layer 500 can protect the lower substrate 400, the order of forming the protective layer 700 and the adhesive layer 500 is not limited in the present disclosure.

At least one embodiment of the present disclosure provides a method of thinning a substrate, and the substrate comprises a base substrate and an electronic device disposed on the base substrate. The method of thinning the substrate comprises: forming an adhesive layer, the adhesive layer overlays at least the electronic device and extends to and overlay part of a side surface of the base substrate; and removing part of the base substrate which corresponds to remaining part of the side surface non-overlaid with the adhesive layer.

In the present method, by disposing the adhesive layer on part of a side surface of the substrate and the electronic device, part of the substrate overlaid with the adhesive layer can be protected, and a thinning thickness of the substrate can be defined by the adhesive layer, therefore, the thinning defect-free ratio of the substrate can be increased.

For example, in at least one embodiment of the present disclosure, the method of thinning the substrate may further comprise: forming a release film between the adhesive layer and the electronic device; the release film is in contact with and overlays the electronic device, and an outer edge of the release film is in flush with an outer edge of the base substrate.

For example, in at least one embodiment of the present disclosure, after removing the part of the base substrate which corresponds to remaining part of the side surface non-overlaid with the adhesive layer, the method of thinning the substrate may further comprise: peeling the release film and the adhesive layer together from the base substrate.

Figure 5A:
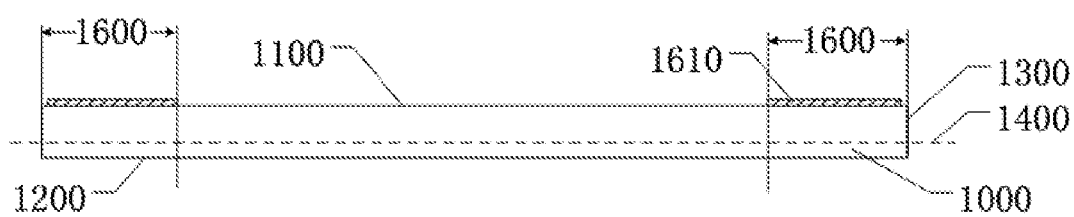
FIGS. 5a to 5e schematically illustrate steps of a method of thinning a substrate according to an embodiment of the present disclosure.

FIGS. 5a to 5e illustrate steps of a method of thinning a substrate according to an embodiment of the present disclosure. In the present embodiment, as illustrated in FIGS. 5a to 5e, a method of thinning a substrate may comprise:

Providing a substrate to be thinned. For example, as illustrated in FIG. 5a, the substrate 1000 to be thinned is provided, which comprises a base substrate 1000 and an electronic device 1610 disposed on the base substrate 1000. The substrate 1000 may further comprise a main surface 1100, a rear surface 1200 and a side surface 1300. The main surface 1100 comprises an element region 1600, and the electronic device 1610 may be disposed in the element region 1600. A third presupposed thinned surface 1400 is located in the substrate, the third thinned surface 1400 is a fictitious surface which represents a thinned thickness of the substrate. The position of the third thinned surface 1400 is defined by other structures (such as an adhesive layer 500).

It is noted that, the position of the electronic device 1610 is not limited in the present embodiment, the electronic device 1610 may be disposed on the main surface 1100 of the substrate, and may be disposed on any position of the main surface. The position of the electronic device 1610 depends on the actual requirements, and not limited to the element region 1600. To facilitate the explanation of the thinning method provided in embodiments of the present disclosure, in the following embodiments of the present disclosure, it is taken an example that the electronic device 1610 is disposed in the element region 1600, to describe the technical solutions in embodiments of the present disclosure.

Figure 5B:
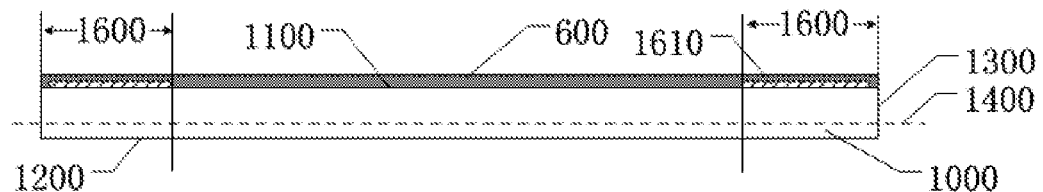

Forming a release film. For example, as illustrated in FIG. 5b, the release film 600 is formed on the main surface 1100 of the substrate, and the release film 600 may be disposed between the adhesive layer 500 and the electronic device 1610. The release film 600 serves to protect, for example, the electronic device 1610 and the like disposed on the main surface 1100. For example, in the present embodiment, the release film 600 overlays at least the main surface 1100 of the substrate, therefore, the whole structures disposed on the main surface 1100 can be protected. For example, in the present embodiment, the release film 600 may be in contact with and overlay on the electronic device 1610, and an outer edge of the release film 600 and the outer edge of the base substrate 1000 may be flushed with each other. The arrangement of the release film 600 may be referred to the aforementioned embodiment, which will not be described herein.

Figure 5C:
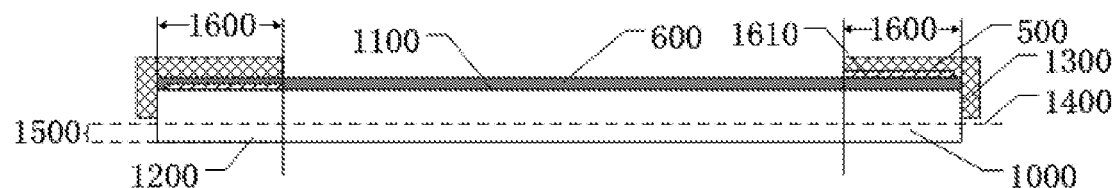

Forming an adhesive layer. For example, as illustrated in FIG. 5c, the adhesive layer 500 is formed on the base substrate 1000, and the adhesive layer 500 overlays at least the electronic device 1610 of the substrate. The adhesive layer 500 may be a single-layer structure, or may be a structure with two or more layers. A step of forming the adhesive layer 500, for example, comprises: coating an adhesive material, and curing it. The material of the adhesive layer 500 may be referred to the aforementioned embodiment, which will not be described herein.

Figure 5D:
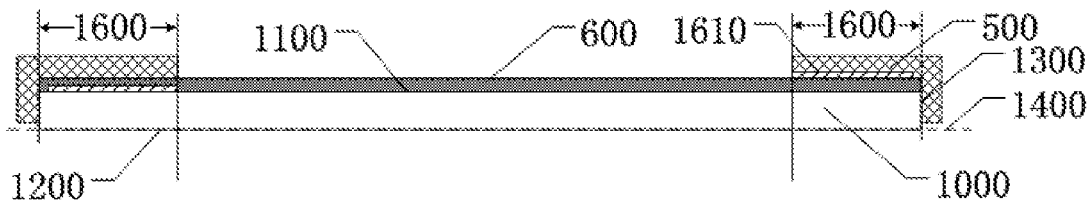

Removing a part of the base substrate non-overlaid with the adhesive layer. For example, as illustrated in FIG. 5d, a thinning process is performed on the substrate, to remove the part of the base substrate 1000 away from the main surface 1100 and bounded by the third thinned surface 1400, which is the third part 1500. The thinning process may be referred to the aforementioned embodiment, which is not described herein.

It is noted that, the position of the third thinned surface 1400 may be defined by the adhesive layer 500; in an actual process, in order to avoid an uneven surface after the thinning method, a distance from an edge of the adhesive layer 500 on the side surface 1300 to the rear surface 1200 may be less than the distance from the third thinned surface 1400 to the rear surface 1200. While the edges of the third thinned surface 1400 and the adhesive layer 500 on the side surface 1300 are coplanar with each other, the third part is the part of the base substrate 1000 which is not overlaid with the adhesive layer 500 and is defined by the edge of the adhesive layer 500 on the side surface 1300.

Figure 5E:
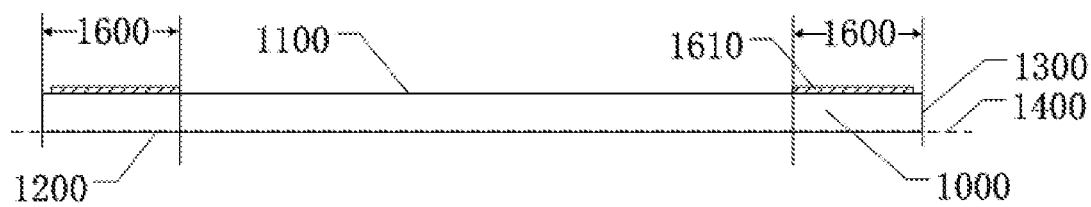

Removing structures such as the adhesive layer and the like. For example, as illustrated in FIG. 5e, after the thinning process is performed on the base substrate 1000 of the substrate, the structures such as the adhesive layer 500 and the like on the substrate are removed. For example, the adhesive layer 500, the release film 600 and the like may be peeled off the base substrate 1000 together.

In the method of thinning the substrate provided in embodiment of the present disclosure, the composition, materials and the like of the adhesive layer 500 and the release film 600 may be referred to the aforementioned embodiment, which will not be described herein.

At least one embodiment of the present disclosure further provides a method of processing a display motherboard, which comprises: cutting a display motherboard into a plurality of display sub-boards; and thinning the display sub-boards by using the thinning method provided in any one of the above embodiments.

The display motherboard may be a display panel motherboard or a display substrate motherboard; similarly, the display sub-board may be a display panel sub-board or a display substrate sub-board. To facilitate the explanation of the technical solutions of the present disclosure, the technical solutions of the embodiments will be described by taking the display panel motherboard as an example.

According to an embodiment of the present disclosure, after the display motherboard is cut into a plurality of display sub-boards, the display sub-boards are subjected to a thinning process. Since the display sub-board doesn't need post-processes such as a cutting process, the strength requirement for the thinned surface of the display panel is relatively low, and the thickness of the display sub-board is allowed to be further reduced in the thinning process. Additionally, the processing method of the display motherboard provided in embodiments of the present disclosure could reduce the cost of new technology verification. For example, during the new technology verification, samples are needed to be selected from the display products to detect the function of products; for the current processing method of the display motherboard, the thinning process is performed only on the entire display motherboard, thus the resources and production capacity are wasted; however, in the processing method of the display motherboard provided in embodiments of the present disclosure, a plurality of sub-boards may be obtained after cutting the display motherboard, which can be used as the samples in new technology verification, and each of the display sub-boards can be thinned by the thinning method provided in embodiments of the present disclosure, therefore, the cost can be greatly reduced and the production cost can be saved.

The method of thinning a substrate and the method of thinning a display panel according to embodiments of the present disclosure may have at least one of the following advantageous effects:

(1) According to the method of thinning the display panel provided in at least one embodiment of the present disclosure, before the thinning process is performed, part of the side surface of the display panel is overlaid with the adhesive layer, so the overlaid part of the display panel cannot be corroded in the thinning process.

(2) According to the method of thinning the display panel provided in at least one embodiment of the present disclosure, the position of the thinned surface can be defined by the adhesive layer disposed on the side surface of the display panel, therefore, the thinning degree of the display panel can be defined.

(3) According to the method of thinning the substrate provided in at least one embodiment of the present disclosure, before the thinning process is performed, part of the side surface of the substrate and important elements on the main surface of the substrate are overlaid with the adhesive layer, so the overlaid part of the substrate cannot be corroded in the thinning process.

In the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

What is described above is related to the illustrative embodiments of the disclosure only and not limitative to the scope of the disclosure; the scopes of the disclosure are defined by the accompanying claims.

The invention claimed is:

1. A method of thinning a display panel, wherein the display panel comprises an upper substrate and a lower substrate disposed opposite to each other, the method of thinning the display panel comprises:
   forming an adhesive layer between two surfaces of the upper substrate and the lower substrate which are face to face, wherein the adhesive layer is configured to fill a gap between the upper substrate and the lower substrate, extend to and overlay a part of a side surface of the display panel; and
   removing part of the display panel which corresponds to remaining part of the side surface non-overlaid by the adhesive layer,
   wherein the upper substrate comprises a display region and a non-display region, the adhesive layer overlays at least the non-display region;
   wherein the method further comprises:
   forming a release film between the adhesive layer and the non-display region;
   wherein the release film is in contact with and overlays the non-display region, and an outer edge of the release film is coplanar with an outer edge of the lower substrate.

2. The method of thinning the display panel according to claim 1, wherein after removing part of the display panel which corresponds to remaining part of the side surface non-overlaid by the adhesive layer, the method further comprises:
   peeling both the release film and the adhesive layer from the display panel.

3. The method of thinning the display panel according to claim 1, wherein the adhesive layer continuously overlays all side surfaces of the display panel on the periphery of the display panel.

4. The method of thinning the display panel according to claim 1, wherein the adhesive layer comprises a first adhesive layer, the forming the adhesive layer between two surfaces of the upper substrate and the lower substrate which are face to face comprises:
   forming the first adhesive layer, wherein the first adhesive layer is formed between the two surfaces of the upper substrate and the lower substrate which are face to face, and fills the gap between the upper substrate and the lower substrate.

5. The method of thinning the display panel according to claim 4, wherein the adhesive layer further comprises a second adhesive layer, and the forming the adhesive layer between two surfaces of the upper substrate and the lower substrate which are face to face further comprises:

forming the second adhesive layer on the first adhesive layer, wherein the second adhesive layer overlays part of a side surface of the upper substrate and overlays part of a side surface of the lower substrate, the two side surfaces are disposed on a same side of the display panel.

6. The method of thinning the display panel according to claim 5, wherein
   a first thinned surface parallel to the upper substrate is located in the upper substrate, and a distance from an edge of the second adhesive layer away from the lower substrate to the lower substrate is less than or equal to a distance from the first thinned surface to the lower substrate; and
   a second thinned surface parallel to the lower substrate is located in the lower substrate, and a distance from an edge of the second adhesive layer away from the upper substrate to the upper substrate is less than or equal to a distance from the second thinned surface to the upper substrate.

7. The method of thinning the display panel according to claim 6, wherein the removing part of the display panel which corresponds to remaining part of the side surface non-overlaid by the adhesive layer comprises:
   removing both a first portion of the upper substrate and a second portion of the lower substrate, wherein the first portion of the upper substrate is away from the lower substrate and bounded by the first thinned surface, and the second portion of the lower substrate is away from the upper substrate and bounded by the second thinned surface.

8. The method of thinning the display panel according to claim 5, wherein the adhesive layer further comprises a second adhesive layer, and the forming the adhesive layer between two surfaces of the upper substrate and the lower substrate which are face to face further comprises:
   forming the second adhesive layer on the first adhesive layer, wherein the second adhesive layer overlays the part of the side surface of the upper substrate and overlays entire side surface of the lower substrate, the two side surfaces are disposed on the same side of the display panel.

9. The method of thinning the display panel according to claim 8, wherein before removing part of the display panel which corresponds to remaining part of the side surface non-overlaid by the adhesive layer, the method further comprises:
   forming a protective layer on at least an outmost surface of the lower substrate;
   wherein the protective layer is in contact with the second adhesive layer, and a distance from an edge of the second adhesive layer away from the upper substrate to the upper substrate is greater than or equal to a distance from an edge of the protective layer close to the upper substrate to the upper substrate.

10. The method of thinning the display panel according to claim 9, wherein
    a first thinned surface parallel to the upper substrate is located in the upper substrate, and a distance from the edge of the second adhesive layer away from the lower substrate to the lower substrate is less than or equal to a distance from the first thinned surface to the lower substrate;
    wherein the removing part of the display panel which corresponds to remaining part of the side surface non-overlaid by the adhesive layer comprises:
    removing a first portion of the upper substrate away from the lower substrate and bounded by the first thinned surface.

11. The method of thinning the display panel according to claim 5, wherein a viscosity of the first adhesive layer is ranged from 100 centipoises to 1000 centipoises; and a viscosity of the second adhesive layer is ranged from 500 centipoises to 10000 centipoises.

12. The method of thinning the display panel according to claim 1, wherein the upper substrate is one of an array substrate and a color filter substrate, and the lower substrate is another one of the array substrate and the color filter substrate.

* * * * *